United States Patent
Lifshitz et al.

(10) Patent No.: US 7,251,287 B1
(45) Date of Patent: Jul. 31, 2007

(54) METHOD AND SYSTEM FOR COMMUNICATION SPECTRAL BACKWARD COMPATIBILITY

(75) Inventors: Israel Lifshitz, Jerusalem (IL); Ran Kern, Tel Aviv (IL); Boaz Kol, Tel Aviv (IL)

(73) Assignee: Coppergate Communication Ltd., Tel Aviv (IL)

( * ) Notice: Subject to any disclaimer, the term of this patent is extended or adjusted under 35 U.S.C. 154(b) by 887 days.

(21) Appl. No.: 10/119,421

(22) Filed: Apr. 9, 2002

Related U.S. Application Data

(63) Continuation-in-part of application No. 10/055,197, filed on Jan. 21, 2002.

(51) Int. Cl.
*H04L 24/00* (2006.01)

(52) U.S. Cl. ........................ 375/295; 375/222
(58) Field of Classification Search ............... 375/222, 375/219, 295, 302
See application file for complete search history.

(56) References Cited

U.S. PATENT DOCUMENTS

| | | | |
|---|---|---|---|
| 5,987,068 A | 11/1999 | Cassia et al. | 375/281 |
| 6,011,807 A | 1/2000 | Castagna et al. | 370/506 |
| 6,298,051 B1 | 10/2001 | Odenwalder et al. | 370/342 |
| 2002/0003835 A1* | 1/2002 | Wu | 375/219 |
| 2002/0015404 A1* | 2/2002 | Fisher et al. | 370/352 |
| 2002/0019966 A1* | 2/2002 | Yagil et al. | 714/752 |
| 2003/0156592 A1* | 8/2003 | Ojard et al. | 370/419 |
| 2003/0156656 A1* | 8/2003 | Ojard et al. | 375/295 |

* cited by examiner

*Primary Examiner*—Chieh M. Fan
*Assistant Examiner*—Jason M. Perilla
(74) *Attorney, Agent, or Firm*—Darby & Darby

(57) ABSTRACT

Communications method including the procedures of modulating a second generation carrier signal, with a first generation Baseband bandwidth signal, when transmitting to first generation devices, and, modulating the second generation carrier signal, with a second generation Baseband bandwidth signal, when transmitting to second generation devices, wherein the first generation Baseband bandwidth signal, is shaped so as to recreate a first generation signal, when up-sampled and modulated with a second generation carrier signal.

42 Claims, 11 Drawing Sheets

METHOD AND SYSTEM FOR COMMUNICATION SPECTRAL BACKWARD COMPATIBILITY

This application is a continuation-in-part of U.S. patent application Ser. No. 10/055,197, filed on Jan. 21, 2002 which is hereby incorporated hereby by reference in its entirety.

FIELD OF THE TECHNOLOGY

The disclosed technique relates to communication methods and systems, in general, and to methods and systems which are backward compatible with prior generations thereof, in particular.

BACKGROUND OF THE DISCLOSED TECHNIQUE

Networked devices communicate using signals sent over common physical media networks, which can be either wired or wireless. Such a network interconnects devices of different generations having different communication parameters. Backward compatibility of new generation devices with older generation devices, is a desired quality. Compatibility implies co-existence, such that new generation devices do not interfere with old generation transmissions. Compatibility may further imply interoperability, such that new generation devices and old generation devices, are able to communicate there between.

Such devices may be connected in a point-to-point architecture, wherein only two such devices are connected, or in a networked architecture, wherein a plurality of devices share the same physical communication medium and intercommunicate there between.

Conventional communication standards employ several methods in order to ensure backward compatibility. One type of such methods is called "Fall-back". "Fall-back" methods artificially degrade the capabilities of the later generation device, forcing them to be comparable with those of prior generation devices. A network which is composed of both prior and later generation devices, operates according to the communication standard of the prior generation devices, even for communication between two later generation devices.

Another type of such methods is called self-describing frame format methods. In these methods, when two later generation devices communicate, later generation data formatted transmission is encapsulated, such that the header of the transmission is in prior generation format. The header can include information related to the generation of the data encapsulated thereafter or information related to a destination node. A prior generation device, receiving such data, after decoding the header portion of the data, shall determine that this data is not intended therefor and hence shall ignore the rest of the data. A later generation device, receiving the same transmission, after decoding the header, will decode the rest of the data, using the newer communication standards.

A further method of providing backwards compatibility, is by adding a component, to each prior generation device, which will provide translation capabilities, of later generation standards, to those recognizable by the prior generation device, and vice versa. Such devices allow communication across the network to be conducted, using later generation technology, while allowing prior generation devices, to participate in the data exchange across the network.

U.S. Pat. No. 6,298,051, entitled "High-data-rate supplemental channel for CDMA telecommunications system", issued to Odenwalder et al., is directed to a method for transmitting a supplemental high rate data channel in tandem with existing data channels over a CDMA over-the-air transmission. This is accomplished by providing a quadrature-phase channel, orthogonal to the in-phase channels used to transmit normal-rate CDMA data, in such a way as to avoid interfering with the in-phase channel. Thus, normal rate capable CDMA devices, which are unable to detect the quadrature-phase channel, are not influenced by the high rate data. The method thus illustrated ensures compatibility of the high-rate capable devices with the normal rate devices.

U.S. Pat. No. 6,011,807, entitled "Method and apparatus for transmitting data in a high rate, multiplexed data communication system", issued to Castagna et al., is directed to a method and apparatus for determining synchronization and loss of synchronization in a high rate multiplexed data system. The method employs a backwards compatibility flag that allows the apparatus to operate with older systems. By using the backwards compatibility flag to detect if an incoming transmission is initiated in an older system, and activating relevant circuitry accordingly, the apparatus is able to maintain compatibility with older systems.

U.S. Pat. No. 5,987,068, entitled "Method and apparatus for enhanced communication capability while maintaining standard channel modulation compatibility", issued to Cassia et al., is directed to a method for enhancing communication capabilities. The method modulates a first communication signal, using a standard modulation technique, onto a carrier signal, thereby producing a first transmission signal. The method further modulates a supplemental communication signal onto the first transmission signal, thereby producing a combined transmission signal, which is then broadcast. The standard modulation scheme for the first communication signal, is differential quadrature phase shift keying (DQPSK). When the combined transmission signal is demodulated using DQPSK, the first communication signal is extracted there from. When a receiving device is aware of the enhanced modulation scheme used in the combined transmission signal, it demodulates the signal accordingly, extracting both the first communication signal, and the supplemental communication signal. When a receiving device is not aware of the enhanced modulation scheme it demodulated the combined transmission signal using DQPSK demodulation, extracting the first communication signal. Thus compatibility is ensured when transmitting to a device unaware of the enhanced modulation scheme used.

IEEE Standard 802.3 details the standards for the Ethernet local networking interface and protocol. The 802.3 standard encompasses technologies of various communication rates, namely 10 Mbps, 100 Mbps and 1000 Mbps. In order to ensure backwards compatibility between newer high-rate devices and older low-rate devices, the standard details an auto-negotiation implementation. Accordingly, high-rate devices detect a transmission from a low-rate device, infer a connection to such a device, and reduce the communication rate accordingly. Such a rate reduction ensures backward compatibility with the low-rate communication device.

A family of communication specifications which exhibit backward compatibility, is known as Home Phoneline Networking Alliance (HPNA). The first generation, HPNA-1, defines transmission around a carrier frequency $F_{HPNA-1}$, with Pulse Position Modulation.

The second generation defines transmission around a carrier frequency $F_{HPNA-2}$, but with Frequency Diverse/Quadrature Amplitude Modulation (FDQAM/QAM). An HPNA-2 device which communicates with an HPNA-1 device, transmits an HPNA-1 format pulsed transmission around $F_{HPNA-1}$ using an HPNA-1 transmitter incorporated into the HPNA-2 device. In the presence of HPNA-1 devices, an HPNA-2 device which communicates with a non-HPNA-1 device, commences a transmission with an HPNA-1 format pulsed like header, encapsulating information which causes HPNA-1 devices to discard the rest of the transmission.

US Patent Application 2002/0015404, entitled "Extended Bandwidth HomePNA System Compatible with HomePNA 2.0", by Fisher et al., is directed to a method for using an extended bandwidth HPNA system, compatible with the HPNA 2.0 standard, in such a way as to cause HPNA 2.0 systems to ignore transmissions not intended for those systems. The system uses a transmission signal centered on 10 MHz, having a 12 MHz bandwidth, to communicate between extended bandwidth systems. In order to allow for compatibility with HPNA 2.0 systems, the proposed system produces a training sequence that an HPNA 2.0 system is able to train on and determine that the incoming packet is not intended for the HPNA 2.0 receiver. The training sequence is produced by zero padding a 2 MBaud symbol sequence to an 8 MBaud sequence (up-sampling the signal), and then modulating the 8 MBaud sequence on to a 1 MHz carrier. This modulation shift the spectrum of the 8 MBaud sequence by 1 MHz. The shifted signal is then modulated on the 10 MHz carrier. The portion of the modulated signal between 4 MHz and 10 MHz is identical to an HPNA 2.0 signal, thus allowing an HPNA 2.0 receiver to train on the training sequence.

SUMMARY OF THE DISCLOSED TECHNIQUE

It is an object of the disclosed technique to provide a novel method and system for backward compatibility between different generations of communication devices, interconnected on the same physical network.

In accordance with the disclosed technique, there is thus provided a method to ensure backward compatibility between different generations of communication devices. The method includes the procedure of mixing a first generation bandwidth Baseband signal, to produce a mixed first generation Baseband signal, having a first generation Baseband bandwidth, when transmitting to first generation devices, by second generation devices, the mixing is performed such that the mixed first generation Baseband signal, is spectrally shifted with respect to said first generation Baseband signal, by a factor equal to the fraction portion of the difference between a first generation carrier signal frequency and a second generation carrier signal frequency, divided by said first generation Baseband bandwidth. The method further includes the procedure of modulating the mixed signal with a second generation carrier signal. The modulation creates at least one copy of the Baseband signal, centered on an old generation carrier frequency, thus, old generation devices, can demodulate the Baseband signal, thereby receiving data from new generation devices.

In accordance with another aspect of the disclosed technique, there is thus provided a second generation communication device which can transmit backward compatible signals, to first generation devices. The device includes a first signal generator, generating a first generation bandwidth Baseband signal, a second signal generator, generating a second generation bandwidth Baseband signal, a signal shaper, an up-sampler, a controller, a switch, a carrier signal generator, and a modulator. The signal shaper is coupled with the up-sampler and the first signal generator. The switch is coupled with the up-sampler, the second signal generator, the controller and the modulator. The modulator is coupled with the switch, the carrier signal generator and the communication interface. When data is transmitted to new generation devices, the controller selects the second signal generator, which provides a second generation Baseband signal to the modulator, via the switch. The modulator modulates a carrier signal provided by the carrier signal generator, with second generation Baseband signal, thereby creating a transmission signal. The communication interface transmits the transmission signal to the network. When data is transmitted to old generation devices, the controller selects the first signal generator, which provides a first generation Baseband signal to the signal shaper. The signal shaper shapes the first generation bandwidth Baseband signal, to produce a first generation basic signal copy, when duplicated in the frequency domain, and centered on a second generation carrier signal, and provides the shaped signal to the up-sampler. The up-sampler up-samples the shaped Baseband signal. The up-sampled signal is provided to the modulator via the switch. The modulator modulates the carrier signal with the up-sampled Baseband signal, thereby creating a transmission signal. The communication interface transmits the transmission signal to the network.

In accordance with another aspect of the disclosed technique, there is thus provided a method to ensure coexistence between different generations of communication devices sharing the same physical network. The method includes the procedure of prepending a second generation transmission signal, with a shaped first generation header, thus creating a pre-modulated transmission signal, the shaped header, shaped such that a first generation header is recreated when modulated with a second generation carrier signal. The header instructs first generation devices to ignore the rest of the transmitted signal. The method further includes the step of modulating the pre-modulated transmission signal with a second generation carrier signal and transmitting the produced signal to the network. Thus, when first generation devices receive the transmitted signal the header will instruct them to ignore the rest of the signal, insuring coexistence with second generation devices.

In accordance with another aspect of the disclosed technique, there is thus provided a second generation communication device which can coexist with first generation devices, sharing the same physical network. The device includes a signal generator, generating a second generation Baseband signal, a memory element, a controller, a switch, a carrier signal generator, a modulator and a communication interface. The switch is coupled with the memory element, the signal generator, the controller and the modulator. The modulator is further coupled with the carrier signal generator and the communication interface. The memory element contains a shaped copy of a first generation format Baseband signal, shaped so as to recreate said first generation format Baseband signal when modulated with said second generation carrier signal and demodulated with respect to a first generation carrier signal. The shaped copy of a first generation format Baseband signal is at least a portion of a first generation format header instructing first generation devices to ignore the rest of the transmitted data. The switch prepends the shaped copy of a first generation format Baseband signal, retrieved from the memory element, to the signal received from the signal generator, and provides the combined signal to the modulator. The modulator modulates the combined signal, with a second generation carrier signal, provided from the carrier signal generator, and transmits the signal to the network, via the communication interface. Thus, first generation devices receiving the signal will decipher the header and ignore the rest of the signal, allowing for coexistence on the same network.

BRIEF DESCRIPTION OF THE DRAWINGS

The disclosed technique will be understood and appreciated more fully from the following detailed description taken in conjunction with the drawings in which.

DETAILED DESCRIPTION OF EMBODIMENTS

Figure 1A:
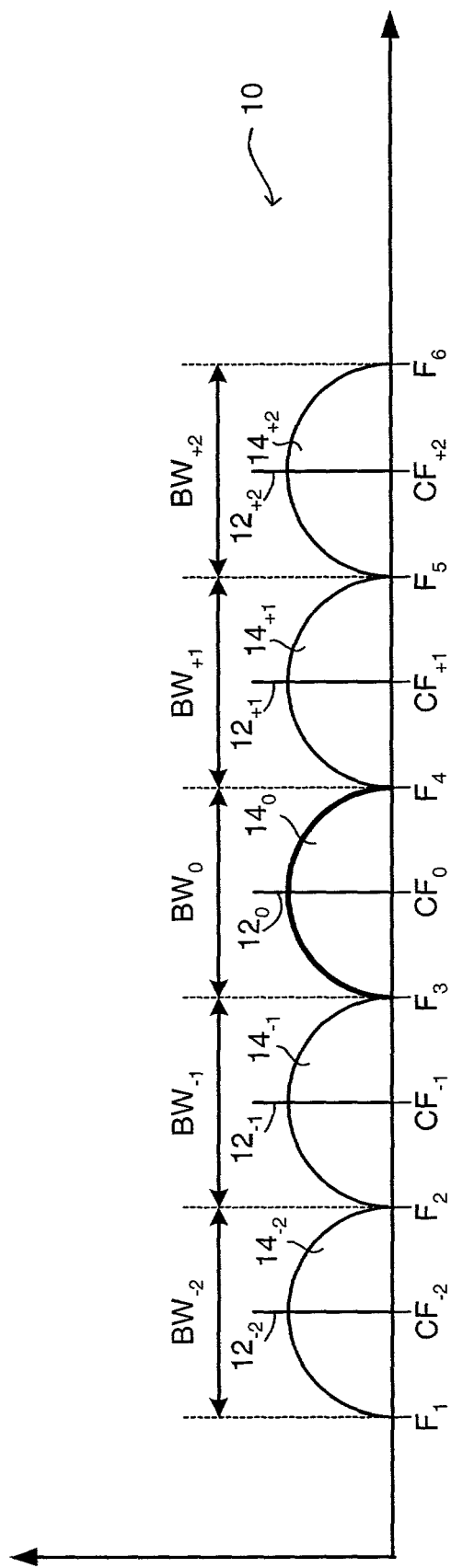
FIG. 1A is a schematic illustration, in the frequency domain, of a transmission signal, which is produced by modulating an up-sampled discrete Baseband signal onto a continuous carrier signal.

The disclosed technique overcomes the disadvantages of the prior art by providing a novel method for communication backward compatibility, which transmits at old generation transmission rate, centered on a new generation carrier frequency. The disclosed technique can be implemented for both analog and digital transmissions.

The terms "old generation" and "new generation" merely represent two different communications specifications, which do not necessarily differ in the point in time, in which each was defined, and hence, for example, can be two communications specifications which were defined at the same time for different purposes. The terms "new" and "old" are interchangeable. Moreover, the two generations can be different modes of operation within the same communications specification. Similarly, such two generations, can be two separate communications specification that belong to different methodologies which belong to different families of methodologies. The disclosed technique can be applied to any two communications specifications, which comply with basic requirements, such as outlined herein below.

In the following description the following terms are used:

Data signal—A signal which can be analog or digital, which can be presented at different levels of encoding, such as raw (i.e., not encoded), encapsulated in data packets (which may include additional information such as headers, error detection and correction sections, and the like), encryption, compression, and the like.

Baseband signal—An original band of frequencies produced by a signal generating device, which can be analog or digital. A Baseband signal is usually used to modulate a carrier signal thereby producing a transmission signal. Demodulation of the transmission signal by the carrier signal, re-creates the Baseband signal. Baseband frequencies are usually characterized by being lower in frequency than the frequencies of the transmission signals, and in some cases also lower than the frequencies of carrier signals or sub-carrier signals. The sampling frequency of the Baseband defines a Baseband bandwidth, which is essentially equal thereto. The Baseband bandwidth is the difference between the highest, and lowest, frequency components in the transmitted Baseband signal. It is noted that the sampling frequency of a digital format Baseband signal is also known as baud-rate.

Frequency range—The frequency range is the continuous range of frequencies used for the transmission of the signal. The difference between the highest, and lowest frequency in the frequency range, is the bandwidth of the signal.

Carrier signal—A cyclic signal which can be analog or digital, at a frequency which in most cases is higher than that of Baseband signals. It is noted that in conventional communication standards, a carrier signal is characterized by a fixed predetermined frequency, although a communication standard may define a plurality of carrier signals, each at a different frequency. A single carrier signal can be described as $S(t)=Ae^{i2\pi f_c t}$, wherein $f_c$ denotes the carrier frequency. Transmission signal—A signal which is physically transmitted across a physical medium, either wired or wireless. The transmission signal is produced by modulating the carrier signal with the Baseband signal. The transmitted signal typically centers on the carrier signal and spreads at least across a range of frequencies, which can be finite or infinite.

Delta function—A single infinite peak, which exists only at a predetermined point, in a given domain. The fundamental property of a delta function is that the integration of the product of a delta function, and a signal function, over the entire domain, equals the value of the signal function, at the point where the delta function is infinite.

Delta function array—A series of delta functions, spaced apart at a predetermined interval, in a given domain.

Fourier transform—A mathematical transformation of a function, from one domain to another. The transformed function can be discrete (e.g., a delta function, a plurality of delta functions, and the like) or continuous (e.g., a SIN function, and the like) as is the result of the transformation. In the following description, Fourier transforms are performed between the time domain and the frequency domain.

Up-sampling—increasing the sample rate of a digital signal by inserting additional samples in a stream of original samples, at predetermined locations therein. The most common case of up-sampling is the insertion of zero value samples between original samples. This type of up-sampling produces exact spectral copies of the original signal in the frequency domain.

Signal shaping—a process by which a desired spectral shape is imposed on a data signal, by using a shaping function.

Mixing—a process by which two data signals are multiplied, creating a new output signal. It is noted that one of the signals may be selected to be a shaping function signal, which is directed at imposing a desired change on the data signal, so that the output signal is an accordingly changed copy of the data signal. For example, the shaping function signal may be selected so that the desired change is a phase shift, an amplitude adjustment, and the like. Mixing is one example of a signal shaping technique.

Modulation—a process by which an arbitrary signal is mixed with a cyclic signal, producing a combined signal. The combined signal is then filtered to occupy a specified bandwidth and the resulting filtered signal is the product of the modulation.

A digital Baseband signal is a series of values, each at a certain point in time and hence, the digital Baseband signal can be represented as a series of delta functions in the time domain, spaced apart at a predetermined interval. The Baseband signal modulates the carrier signal, thereby producing the transmission signal. Extracting the data signal from a received transmission signal requires demodulation of the carrier signal, to obtain the Baseband signal.

It will be appreciated by those skilled in the art that a product of the Baseband signal and the carrier signal, in the time domain is equivalent to the convolution of the Fourier transform of the two signals.

$$\delta(t) \cdot f(t) \Longleftrightarrow F(\omega) * \Delta(\omega)$$

It is noted that a Fourier transform of a delta function array in one domain, is also a delta function array, with a different interval in another domain.

In addition, when a delta function array signal is modulated on a continuous signal, the product signal is equal to a convolution of the two in the frequency domain. The product signal, when represented in the frequency domain, contains a plurality of copies of a basic signal.

When the continuous signal exhibits a single frequency, each copy of the basic signal is centered on a different frequency, one of them being that of the continuous signal. The center frequencies are spaced according to the interval bandwidth of the delta function array signal.

Multiple copies of a digital format Baseband signal may be created by up-sampling the Baseband signal. Digital up-sampling may be viewed in the frequency domain, as broadening the digital frequency range, while keeping the same analog spectrum. Therefore, more spectral copies will be included in the digital frequency range. It will be appreciated that up-sampling may be performed either before, or after a transmission signal has been modulated with a carrier signal, by employing essentially the same techniques.

Reference is now made to FIG. 1, which is a schematic illustration, in the frequency domain, of a transmission signal, generally referenced 10, which is produced by modulating a Baseband signal onto a carrier signal.

Transmission signal 10 includes a basic signal $14_0$ and a plurality of basic signal copies $14_{-2}$, $14_{-1}$, $14_{+1}$ and $14_{+2}$ thereof. Basic signal $14_0$ is centered on a center frequency $12_0$, of a value $CF_0$. Basic signal copies $14_{-2}$, $14_{-1}$, $14_{+1}$ and $14_{+2}$ are centered on center frequencies $12_{-2}$, $12_{-1}$, $12_{+1}$ and $12_{+2}$ of values $CF_{-2}$, $CF_{-1}$, $CF_{+1}$ and $CF_{+2}$. In theory, signal 10 can extend from zero frequency to infinity. In practice, such signals are truncated by a truncating bandwidth filter.

Basic signal $14_0$ exhibits a bandwidth $BW_0$, extending from a frequency $F_3$ to a frequency $F_4$, which is typically the bandwidth of the discrete Baseband signal. Basic signal copies $14_{-2}$, $14_{-1}$, $14_{+1}$ and $14_{+2}$ each exhibit bandwidths $BW_{-2}$ (between frequencies $F_1$ and $F_2$), $BW_{-1}$ (between frequencies $F_2$ and $F_3$), $BW_{+1}$ (between frequencies $F_4$ and $F_5$) and $BW_{+2}$ (between frequencies $F_5$ and $F_6$), respectively. It is noted that the value of each bandwidths $BW_{-2}$, $BW_{-1}$, $BW_{+1}$ and $BW_{+2}$ is equal to that of bandwidth $BW_0$.

Demodulating the basic signal $14_0$ with respect to center frequency $12_0$ ($CF_0$), shall reconstruct the modulating discrete Baseband signal. Similarly, demodulating any of the basic signal copies $14_{-2}$, $14_{-1}$, $14_{+1}$ and $14_{+2}$ with respect to their respective center frequencies $12_{-2}$ ($CF_{-2}$), $12_{-1}$ ($CF_{-1}$), $12_{+1}$ ($CF_{+1}$) and $12_{+2}$ ($CF_{+2}$), shall also reconstruct the modulating discrete Baseband signal.

Demodulation of the transmission signal can be performed in a joint fashion, for all basic signal copies. Joint demodulation is performed with respect to center frequency $12_0$, by sampling the transmission signal, prior to demodulation, thereby centering all basic signal copies, on center frequency $12_0$. Such joint demodulation can be used to increase robustness, by allowing the Baseband signal to be recreated, from one, or more, basic signal copies.

It will be appreciated by those skilled in the art, that a Baseband signal may be shaped, so as to exhibit a different spectral shape, by applying various techniques which are well known in the art, the most common being mixing the Baseband signal, using a mixer.

The disclosed technique makes use of this phenomenon to provide backward compatibility between different generations of communication standards and methods. According to the disclosed technique, a new generation transmitter incorporates a single carrier signal, for transmitting to both old generation units and new generation units.

When transmitting to an old generation unit, the carrier signal is modulated by a Baseband signal, according to an old generation Baseband bandwidth. The Baseband signal used for modulating the carrier signal, is shaped so as to produce, after duplication in the frequency domain, at least one copy. The old generation basic signal copies are produced, by a combination of portions of the duplicated basic signal copies, created from the shaped Baseband signal. Prior to modulation, the shaped Baseband signal is up-sampled, in order to duplicate the signal in the frequency domain, according to principles illustrated above.

It will be appreciated, that digital mixing of the Baseband signal can be implemented by multiplying the digital signal samples by a factor, which induces a phase change in the signal. In the disclosed technique, each sample of the digital Baseband data, is multiplied by a factor equal to $$\exp\left(j 2\pi k \frac{\Delta f}{f_b}\right),$$

where k is the sample index, $\Delta f$ is the difference between the old generation and new generation carrier frequencies, and $f_b$ is the old generation Baseband bandwidth. It is noted, that by performing such a multiplication, the mixed (multiplied) Baseband signal, when duplicated by up-sampling, will resemble copies of an old generation Baseband signal, with respect to an old generation carrier frequency. Thus, an old generation device will be able to demodulate the mixed Baseband signal, with respect to an old generation carrier frequency.

When transmitting to a new generation unit, the carrier signal is modulated by a different Baseband signal, which may have a higher or lower, Baseband sampling rate, than that of the old generation.

Figure 1B:
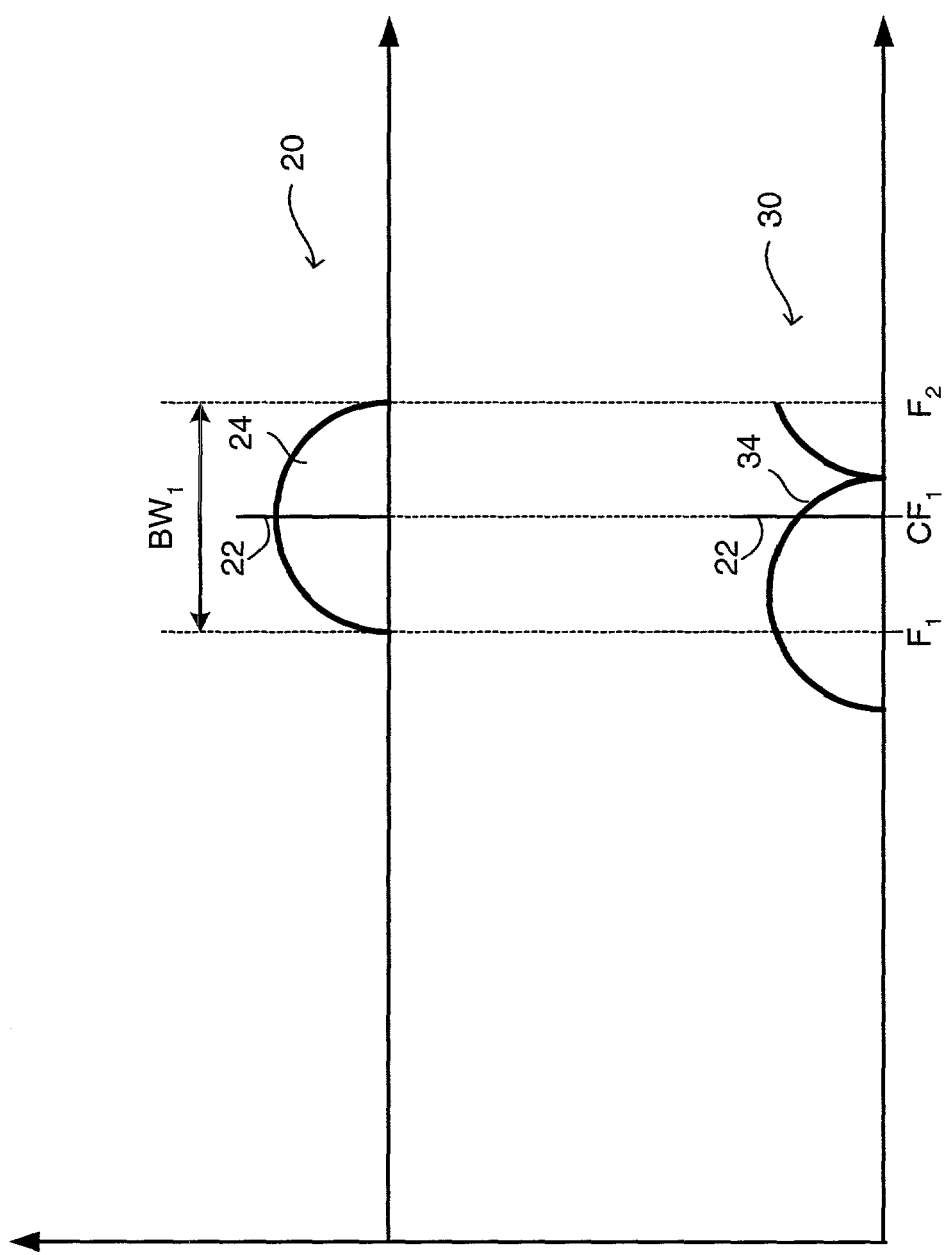
FIG. 1B is a schematic illustration, in the frequency domain, of an original signal and a shaped signal, which is produced by spectrally shaping the original signal.

Reference is now made to FIG. 1B, which is a schematic illustration, in the frequency domain, of an original signal, generally referenced 20, and a shaped signal, generally referenced 30, which is produced by shaping the original signal 20, according to the principles illustrated above.

Original signal 20 includes a basic signal 24, centered on frequency $CF_1$, generally referenced 22, and having a bandwidth of $BW_1$. Shaped signal 30 includes a basic signal 34, having a bandwidth of $BW_1$. It is noted that basic signal 34, has a different spectral shape than that of basic signal 24 of shaped signal 20. According to the principles illustrated above, shaped signal 30 is produced by shaping original signal 20, to the desired spectral shape of basic signal 34.

In general, mixing a signal function with a single frequency function is equivalent in the frequency domain to a convolution of the signal function with a delta function at that specific frequency. When the mixer is analog, then the result shall be a linear shift of the signal function by an interval of the single frequency. Hence, if the signal function is centered on zero and includes frequencies in the range $[-F_{Sa}, F_{Sa}]$ and the specific frequency is $F_C$, then the result shall be a shifted representation of the signal function to center on $F_C$, in the range $[-F_{Sa}+F_C, F_{Sa}+F_C]$.

When the mixer is digital, then the result shall be a cyclic shift of the signal function by an interval of the single frequency. Hence, if the signal function is centered on zero and includes frequencies in the range $[-F_{Sd}, F_{Sd}]$ and the specific frequency is $F_C$ (wherein $-F_{Sd} < F_C < F_{Sd}$), then the result shall be a shifted representation of the signal function to center on $F_C$, but in the range $[-F_{Sd}, F_{Sd}]$, wherein portions which are shifted beyond $F_{Sd}$ are "pushed" back from the end of $-F_{Sd}$. In the example set forth in FIG. 1B, signal 34 is obtained from basic signal 24 by a cyclic shift. As a result, frequencies F1 and F2 are moved to a new location, slightly above CF1.

Figure 2:
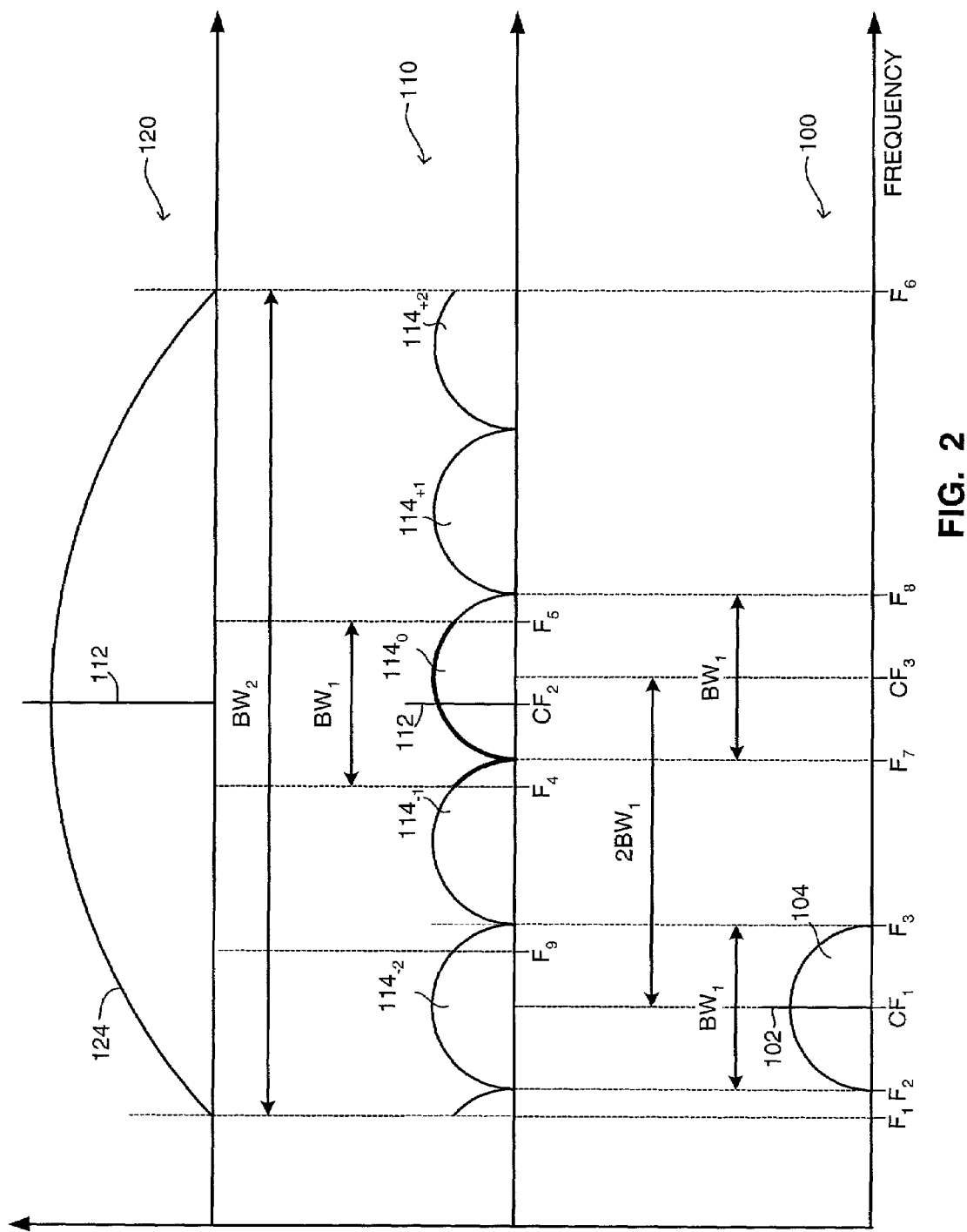
FIG. 2 is a schematic illustration, in the frequency domain, of three transmission signals, some of which are defined and produced in accordance with an embodiment of the disclosed technique.

Reference is now made to FIG. 2, which is a schematic illustration, in the frequency domain, of three transmission signals, generally referenced 100, 110 and 120. Transmission signals 110 and 120 are defined and produced in accordance with an embodiment of the disclosed technique. Transmission signals 100, 110 and 120 are produced by modulating discrete Baseband signals onto carrier signals.

Transmission signal 100 includes a basic signal 104, which is centered on a center frequency 102 ($CF_1$) and exhibits a bandwidth $BW_1$ extending between frequencies $F_2$ and $F_3$. Transmission signal 100 is produced by an old generation transducer (not shown) and is intended for any unit which is compatible therewith (i.e., typically, old generation units and newer generation units which are compatible with the old generation).

Transmission signal 120 includes a basic signal 124, which is centered on a center frequency 112 ($CF_2$) and exhibits a bandwidth $BW_2$ extending between frequencies $F_1$ and $F_6$. Transmission signal 120 is produced by a new generation transducer (not shown) and is intended to any unit which is compatible therewith (i.e., typically, new generation units).

Transmission signal 110 includes a basic signal $114_0$, which is centered on center frequency 112 ($CF_2$) of transmission signal 120, and exhibits a bandwidth $BW_1$, extending between frequencies $F_4$ and $F_5$. Transmission signal 110 further includes basic signal copies $114_{-2}$, $114_{-1}$, $114_{+1}$ and $114_{+2}$. It is noted that basic signal copy $114_{-1}$, extends from frequency $F_9$ to frequency $F_4$, wherein $F_4-F_9=BW_1$. Basic signal $114_0$, is shaped as so that when duplicated, basic signals copies $114_{-2}$ and $114_{-1}$, combine to include a copy of basic signal 104, centered on center frequency 102, exhibiting a bandwidth $BW_1$ extending between frequencies $F_2$ and $F_3$. Accordingly, when received by an old generation unit, the portion of basic signal copy $114_{-2}$, extending from frequency $F_2$ to frequency $F_9$ and the portion of basic signal copy $114_{-1}$, extending from frequency $F_9$ to frequency $F_3$, shall be perceived as an old generation transmission. That old generation unit can demodulate the combined portions of basic signal copies $114_{-2}$ and $114_{-1}$, between frequencies $F_2$ and $F_3$, with respect to center frequency 102 ($CF_1$) in order to receive data, according to the old generation Baseband sampling rate.

Accordingly, a new generation unit can produce transmission signal 110 and transmit it to any unit which is compatible with the old generation (i.e., typically, old generation units and newer generation units which are compatible with the old generation).

According to the disclosed technique, a signal shape is selected, so as to recreate the original Baseband signal, centered on a center frequency located an integer multiple of old generation Baseband bandwidths, away from an old generation carrier frequency. A Baseband signal, shaped according to such a signal shape and up-sampled and modulated on a new generation carrier frequency, includes a copy which can be demodulated according to an old generation Baseband bandwidth.

In the example set forth in FIG. 2, the original Baseband signal is shaped to be spectrally similar to basic signal $114_0$, to allow for demodulation of the duplicated copies, on center frequency 102 ($CF_1$).

According to one aspect of the disclosed technique, the new generation carrier signal center frequency can be located higher than that of the old generation carrier frequency, as described in the example set forth in FIG. 2, or lower than the old generation carrier frequency. According to another aspect of the disclosed technique, the frequency range of the new generation transmission signal can extend beyond the frequency range of the old generation transmission signal. Both of these aspects shall be described herein below, in FIG. 3.

Figure 3:
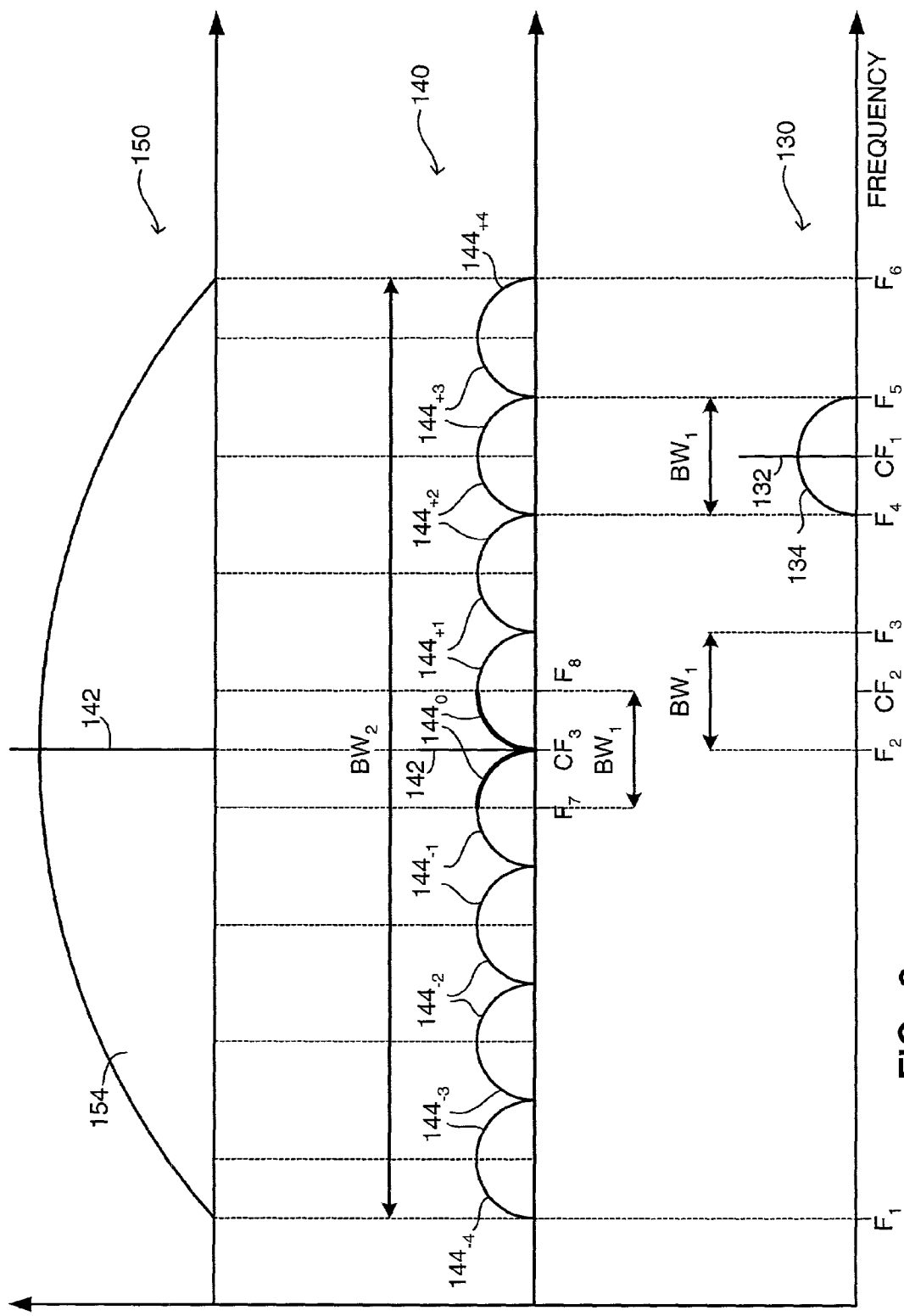
FIG. 3 is a schematic illustration, in the frequency domain, of three transmission signals, some of which are defined and produced in accordance with another embodiment of the disclosed technique.

Reference is now made to FIG. 3, which is a schematic illustration, in the frequency domain, of three transmission signals, generally referenced 130, 140 and 150. Transmission signals 140 and 150 are defined and produced in accordance with an embodiment of the disclosed technique. Transmission signals 130, 140 and 150 are produced by modulating discrete Baseband signals onto continuous carrier signals.

Transmission signal 130 includes a basic signal 134, which is centered on a center frequency 132 ($CF_1$) and exhibits a bandwidth $BW_1$ extending between frequencies $F_4$ and $F_5$. Transmission signal 130 is produced by an old generation transducer (not shown) and is intended for any unit which is compatible therewith (i.e., typically, old generation units and newer generation units which are compatible with the old generation).

Transmission signal 150 includes a basic signal 154, which is centered on a center frequency 142 ($CF_3$) and exhibits a bandwidth $BW_2$, extending between frequencies $F_1$ and $F_6$. Transmission signal 150 is produced by a new generation transducer (not shown) and is intended for any unit which is compatible therewith (i.e., typically, new generation units).

Transmission signal 140 includes a basic signal $144_0$, which is centered on center frequency 142 ($CF_3$) of transmission signal 150, and exhibits a bandwidth $BW_1$, extending between frequencies $F_7$ and $F_8$. Transmission signal 140 further includes basic signal copies $144_{-4}$, $144_{-3}$, $144_{-2}$, $144_{-1}$, $144_{+1}$, $144_{+2}$, $144_{+3}$ and $144_{+4}$. It is noted that basic signal copies $144_{-4}$ and $144_{+4}$ are partial copies of basic signal $144_0$, as transmission signal 140 is limited by the same bandwidth filter which limits signal 150. It is further noted that basic signal $114_0$ is produced by shaping a sampled Baseband signal, in accordance with the principles illustrated above, and using the shaped signal to modulate a carrier signal. The portion of basic signal copy $144_{+2}$, extending from frequency $F_4$ to frequency $CF_1$, together with the portion of basic signal copy $144_{+3}$, extending from frequency $CF_1$ to frequency $F_5$, form a signal which is similar to basic signal 134 of old generation unit, being centered on center frequency 132 and exhibiting a bandwidth of $BW_1$ extending between frequencies $F_4$ and $F_5$. Accordingly, when received by an old generation unit, basic signal copies $144_{+2}$ and $144_{+3}$ may be demodulated as an old generation transmission, with respect to center frequency 132 ($CF_1$) in order to retrieve the original Baseband signal, according to the old generation Baseband bandwidth.

Accordingly, a new generation unit can produce transmission signal 140 and transmit it to any unit which is compatible with the old generation (i.e., typically, old generation units and newer generation units which are compatible with the old generation).

The disclosed technique is applicable for wired communications as well as wireless communications. The example which is described in FIG. 4 herein below, addresses a wired communication standard known as Home Phoneline Networking Alliance ver. 2, which is also called HPNA-2. This example shall present general requirements from a future new generation standard, which shall be here referred to as HPNA-X.

Figure 4:
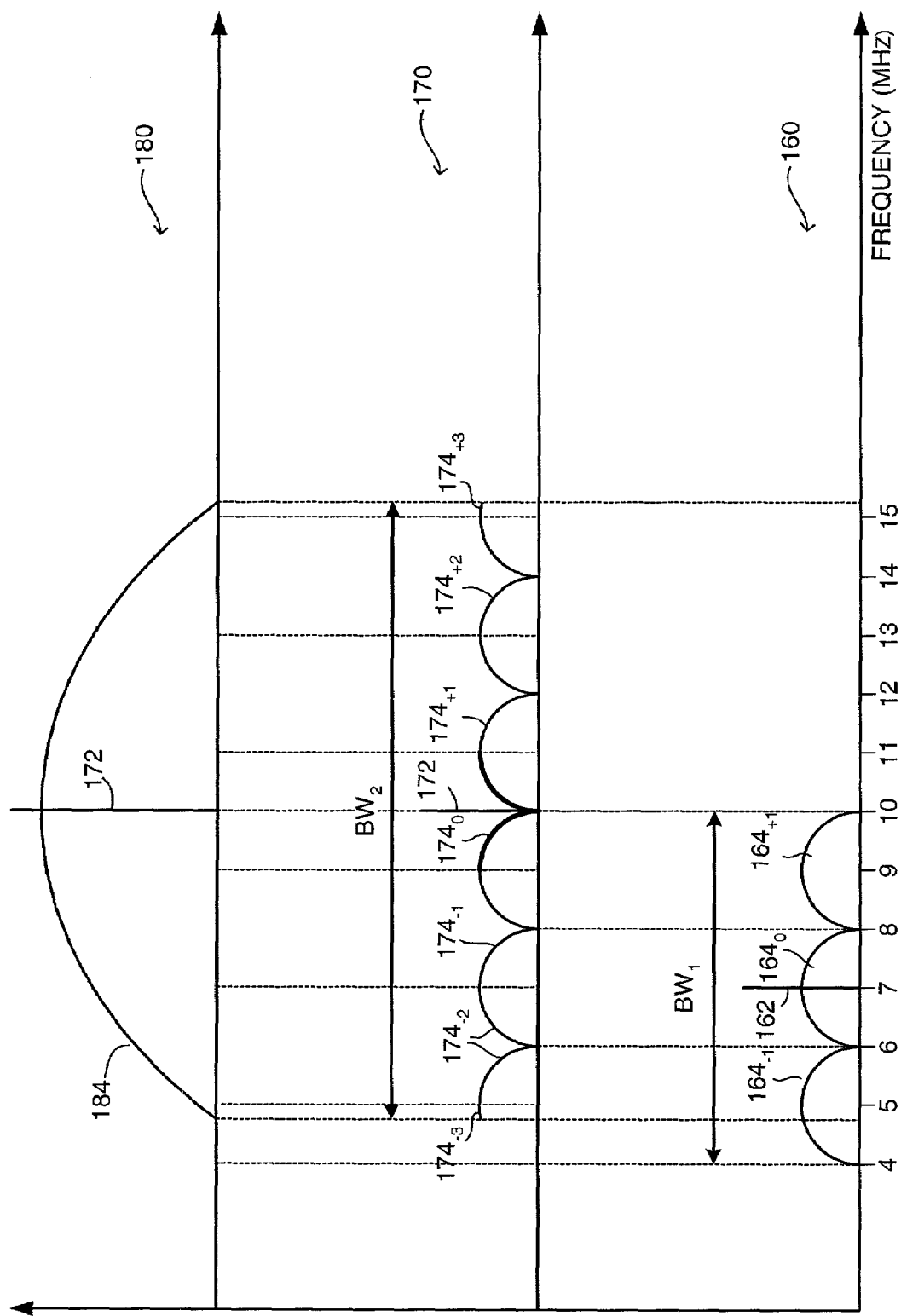
FIG. 4 is a schematic illustration, in the frequency domain, of an HPNA-2 mode of operation transmission signal and two additional transmission signals defined and produced in accordance with a further embodiment of the disclosed technique.

Reference is now made to FIG. 4, which is a schematic illustration, in the frequency domain, of three transmission signals, generally referenced 160, 170 and 180. Transmission signals 170 and 180 are defined and produced in accordance with a further embodiment of the disclosed technique. Transmission signals 160, 170 and 180 are produced by modulating discrete Baseband signals onto carrier signals.

Transmission signal 160 is produced according to HPNA-2 communication standard. Transmission signal 180 is produced according to HPNA-X communication standard. Transmission signal 170 is produced according to HPNA-X communication standard but is intended to be received by HPNA-2 communication standard compatible units.

HPNA-2 communication standard defines a transmission signal which is centered on a carrier signal center frequency of 7 MHz, HPNA-2 communication standard further defines an overall bandwidth of 6 MHz, extending from 4 MHz to 10 MHz.

HPNA-2 communication standards include several modes of operation for producing a transmission signal with that carrier signal center frequency of 7 MHz. According to one HPNA-2 mode of operation, a 2 MHz bandwidth Baseband signal modulates the carrier signal center frequency of 7 MHz. According to this mode of operation, the produced transmission signal includes three instances of a basic signal. With reference to FIG. 4, HPNA-2 transmission signal 160 includes a basic signal $164_0$ and two basic signal copies $164_{-1}$ and $164_{+1}$.

Basic signal $164_0$ is centered on a center frequency 162 (7 MHz) and exhibits a bandwidth of 2 MHz, extending between 6 MHz and 8 MHz. Basic signal copy $164_{-1}$ is centered on 5 MHz and exhibits a bandwidth of 2 MHz, extending between 4 MHz and 6 MHz. Basic signal copy $164_{+1}$ is centered to 9 MHz and exhibits a bandwidth of 2 MHz, extending between 8 MHz and 10 MHz. The HPNA-2 communication standard defines the two basic signal copies $164_{-1}$ and $164_{+1}$ for purposes such as improved robustness, and the like. Transmission signal 160 is produced by an HPNA-2 transducer (not shown) and is intended for any unit which is compatible with the HPNA-2 communication standard.

According to the example of disclosed technique set forth in FIG. 4, a possible future HPNA-X communication standard defines a transmission signal which is centered on a carrier signal center frequency of 10 MHz, and having an overall frequency range of 10.5 MHz, extending from 4.75 MHz to 15.25 MHz. It is noted that the overall frequency range, with respect to the selected carrier signal center frequency, can be set to be broader than 10.5 MHz or as minimal as 4 MHz. Transmission signals 170 and 180 are both centered on a single center frequency 172 (10 MHz).

Transmission signal 180 includes a basic signal 184, which is centered on center frequency 172 (10 MHz) and exploits the entirety of the bandwidth of 10.5 MHz. HPNA-X transducer (not shown) produces transmission signal 180 by modulating the 10 MHz carrier signal with a 10 MHz sampled Baseband signal. Transmission signal 180 is produced by that HPNA-X transducer and is intended for any unit which is compatible with HPNA-X communication standard.

Transmission signal 170 includes a basic signal $174_0$, which is centered to center frequency 172 (10 MHz) of transmission signal to 170, and exhibits a bandwidth of 2 MHz, extending between 9 MHz and 11 MHz. It is noted that basic signal $174_0$, is produced by modulating the carrier frequency 172, with a shaped sampled Baseband signal, in accordance with the principles illustrated above. Transmission signal 170 further includes basic signal copies $174_{-2}$, $174_{-1}$, $174_{+1}$ and $174_{+2}$ and two partial basic signal copies $174_{-3}$ and $174_{+3}$.

Basic signal copy $174_{-2}$ is centered on a center frequency of 6 MHz and exhibits a bandwidth of 2 MHz, extending between 5 MHz and 7 MHz. Basic signal copy $174_{-1}$ is centered on a center frequency of 8 MHz and exhibits a bandwidth of 2 MHz, extending between 7 MHz and 9 MHz. Accordingly, the combination of the portion of basic signal copy $174_{-2}$ extending from 6 MHz to 7 MHz, and the portion of basic signal copy $174_{-1}$, extending from 7 MHz to 8 MHz, form a signal which is compatible with basic signal copy $164_0$ of transmission signal 160. Further accordingly, the combination of the portion of basic signal copy $174_{-1}$, extending from 8 MHz to 9 MHz, and the portion of basic signal $174_0$, extending from 9 MHz to 10 MHz, form a signal which is compatible with basic signal $164_{+1}$ of transmission signal 160.

Partial basic signal copy $174_{-3}$ extends between 4.75 MHz and 5 MHz and is a portion of a basic signal copy (not shown) which is centered on a center frequency of 4 MHz and exhibits a bandwidth of 2 MHz. Partial basic signal copy $174_{+3}$ extends between 15 MHz and 15.25 MHz and is a portion of a basic signal copy (not shown) which is centered on a center frequency of 16 MHz and exhibits a bandwidth of 2 MHz.

Together, basic signal copies $174_{-2}$, $174_{-1}$ and $174_0$ and partial basic signal copy $174_{-3}$ form a signal which can be demodulated by communication devices compatible with the requirements of the HPNA-2 communication standard. Accordingly, when received by an HPNA-2 unit, basic signal copies $174_{-2}$, $174_{-1}$ and $174_0$ and the partial basic signal copy $174_{-3}$ shall be perceived as an HPNA-2 transmission. Hence, an $HPNA_{-2}$ unit can demodulate the transmission signal by using basic signal copies $174_{-2}$, $174_{-1}$ and the portion of basic signal $174_0$ extending from 9 MHz to 10 MHz, in order to reconstruct the original Baseband signal, according to the HPNA-2 band rate.

It is noted that both transmission signals 180 and 170 are produced by the same HPNA-X unit using the same carrier signal center frequency 172 of 10 MHz. It is further noted that the disclosed technique can be applied for other HPNA-2 modes of operation, in the same manner.

Figure 5:
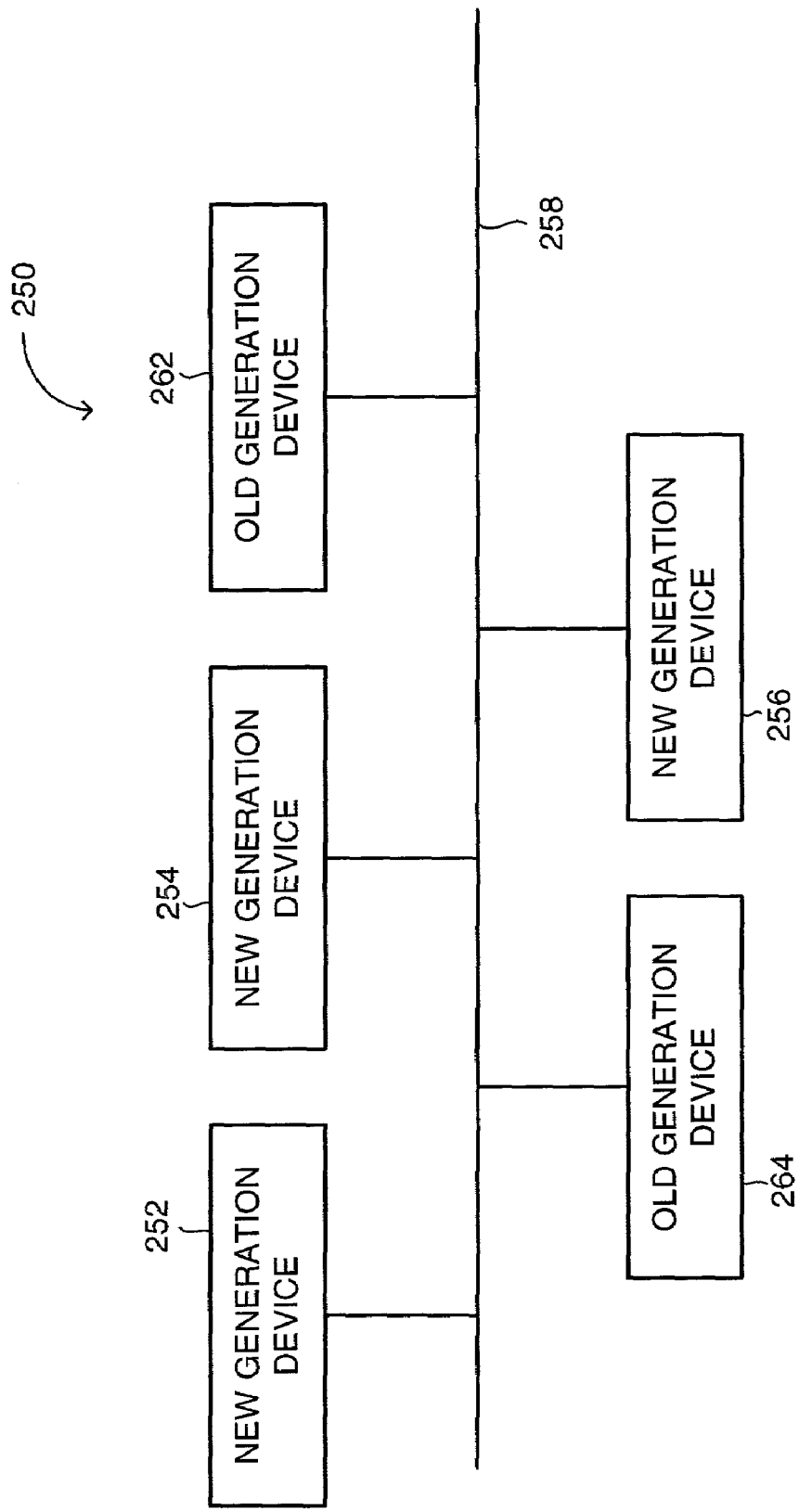
FIG. 5 is a schematic illustration of a network, which includes communication devices from different generations.

Reference is now made to FIG. 5, which is a schematic illustration of a network architecture, generally referenced 250, which includes communication devices from different generations.

Network architecture 250 included a network 258, two old generation communication devices 262 and 264 and three new generation communication devices 252, 254 and 256. Old generation communication devices 262 and 264 are operative to produce and transmit messages according to an old communication standard (OCS) and are further operative to receive and decipher such messages. New generation communication devices 252, 254 and 256 are operative to produce and transmit messages according to a new communication standard (NCS) and are further operative to receive and decipher such messages. New generation communication devices 252, 254 and 256 are further operative to produce and transmit messages, which are compatible with the old communication standard (OCS), according to the disclosed technique.

New generation communication devices 252, 254 and 256 are further operative to produce and transmit messages, which are compatible with the old communication standard (OCS), according to the disclosed technique.

Network architecture 250 is constructed according to a bus architecture. Hence, all of the communication devices 252, 254, 256, 262 and 264, which are coupled therewith, are operative to detect any signal which is transmitted over the network, provided that this signal is within their respective frequency range. However, it is noted that any architecture is applicable for the disclosed technique.

When new generation communication devices transmit new generation format data across the network, old generation communication devices, must ignore such data. In accordance with another embodiment of the disclosed technique, such new generation data is encapsulated in a transmission, which includes a fixed old-generation portion of a header That old generation header portion, is shaped according to disclosed technique, so as to allow demodulation by old generation devices. The old generation header portion includes instructions for old generation communication devices, to ignore the rest of the transmission. The new generation data, is produced in new generation format, and can therefore be accessed, only by the new generation communication devices.

According to a further embodiment of the disclosed technique, an old generation header portion, instructing old generation devices to ignore the rest of the transmission, is shaped as to allow demodulation by old generation devices, and permanently stored in the new generation device memory. Since the header portion, which instructs old generation devices to ignore the rest of the transmission, is identical for all data transmissions the stored header portion may be attached to all transmissions not intended for old generation devices. Attaching the stored header portion eliminates the need for on-line shaping of the header portion, thus conserving real-time processing resources.

Figure 6A:
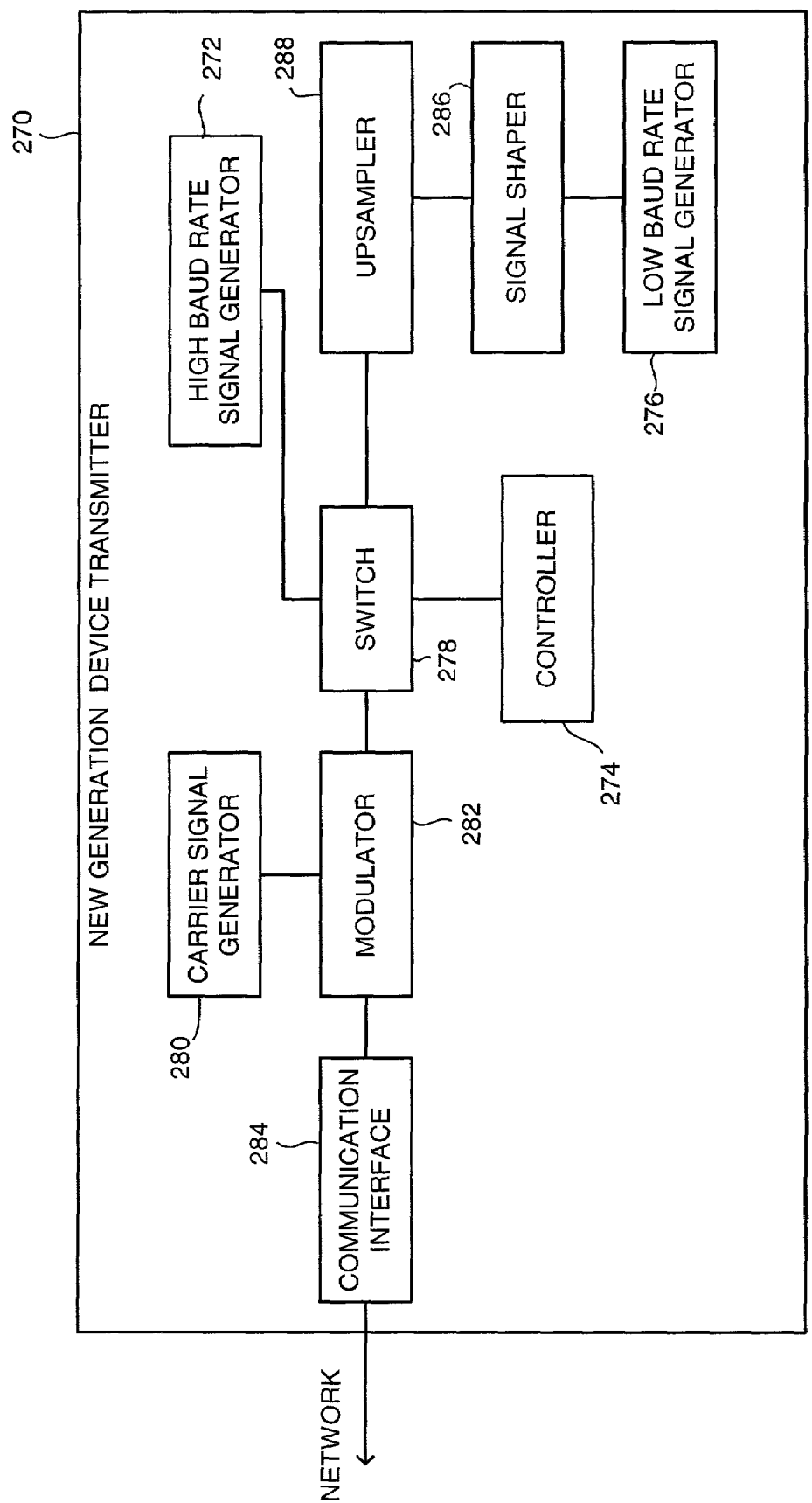
FIG. 6A is a schematic illustration of a new generation device transmitter, constructed and operative in accordance with an embodiment of the disclosed technique.

Reference is now made to FIG. 6A, which is a schematic illustration of a transmitter, generally referenced 270, of new generation device 252 of FIG. 5, constructed and operative in accordance with another embodiment of the disclosed technique. Transmitter 270 includes a high baud rate signal generator 272, a low baud rate signal generator 276, a switch 278, a controller 274, a modulator 282, a carrier signal generator 280, a communication interface 284, a signal shaper 286, and an up-sampler 288.

High baud rate signal generator 272 and up-sampler 288 are alternately coupled with switch 278. Signal shaper 286 is coupled with low baud rate signal generator 276 and with up-sampler 288. Switch 278 is further coupled with controller 274 and to modulator 282. Modulator 282 is further coupled with carrier signal generator 280 and to communication interface 284. Communication interface 284 is further coupled with network 258 (not shown) of FIG. 5. Transmitter 270 is operative to produce transmission signals compatible with both old generation format devices and new generation format devices, by employing the above illustrated technique.

When transmitting to new generation format devices, transmitter 270 uses high baud rate signal generator 272, to generate Baseband data. High baud rate signal generator 272 provides the Baseband data to modulator 282, via switch 278. Carrier signal generator 280 produces a carrier signal and provides it to modulator 282. Modulator 282 modulates the high rate Baseband signal with the carrier signal, thereby producing transmission signal. Modulator 282 provides the transmission signal to communication interface 284, which in turn, transmits the transmission signal to network 258.

When transmitting to old generation format devices, transmitter 270 uses low baud rate signal generator 276, to generate Baseband data. Low baud rate signal generator 276 provides the Baseband data to signal shaper 286, which shapes the Baseband data so as to produce an old generation basic signal copy, when duplicated in the frequency domain, and used to modulate the new generation carrier signal, according to the technique illustrated herein above. Signal shaper 286 provides the shaped Baseband data to up-sampler 288. Up-sampler 288 performs up-sampling of the data, to produce a Baseband signal, which includes multiple copies, of the shaped Baseband signal, in accordance with the technique illustrated above. Up-sampler 288 provides the up-sampled Baseband signal to modulator 282, via switch 278. Other elements of the transmission path are unchanged with respect to transmission to new generation format devices.

According to the example set forth in FIG. 2, when transmitting to new generation format devices, high baud rate signal generator 272 provides Baseband data having a bandwidth of $BW_2$, to transmitter 270. Modulator 282 modulates this Baseband data with carrier signal from carrier signal generator 280, having a frequency 112, to produce transmission signal 120. When transmitting to old generation format devices, low baud rate signal generator 276 provides Baseband data, using, having a bandwidth of $BW_1$, to transmitter 270. Signal shaper 286 shapes the sampled Baseband data to produce a shaped Baseband signal, spectrally similar to basic signal copy $114_0$. Up-sampler 288, up-samples the Baseband data, to produce multiple Baseband signal copies $114_{-2}$, $114_{-1}$, $114_{-0}$, $114_{+1}$, and $114_{+2}$. Modulator 282 modulates up-sampled Baseband data with carrier signal from carrier signal generator 280, having a frequency 112, to produce transmission signal 110, which includes basic signal $114_0$ and basic signal copies $114_{-2}$, $114_{-1}$, $114_{+1}$ and $114_{+2}$.

According to the example set forth in FIG. 4, when transmitting to new generation format devices, high baud rate signal generator 272 provides Baseband data, using, having a bandwidth of 10 MHz, to transmitter 270. Modulator 282 modulates sampled Baseband data with carrier signal from carrier signal generator 280, having a frequency of 10 MHz, to produce transmission signal 180. When transmitting to old generation format devices, low baud rate signal generator 276 provides Baseband data having a bandwidth of 2 MHz, to transmitter 270. Signal shaper 286 shaped the sampled Baseband data to produce a shaped Baseband signal, spectrally similar to basic signal copy $174_0$. Up-sampler 288 up-samples Baseband signal, to produce multiple basic signal copies $174_{-1}$ to $174_{+1}$, of Baseband signal. Modulator 282 modulates up-sampled Baseband data with carrier signal from carrier signal generator 280, having a frequency of 10 MHz, to produce a transmission signal 170, which includes basic signal $174_0$ and basic signal copies $174_{-2}$, $174_{-1}$, $174_{+1}$ and $174_{+2}$.

Controller 274 performs selection between different generation format data, by operating switch 278, to couple with desired signal generator. Controller 274 is controlled by other elements (not shown) of communication device 252 (FIG. 5).

Alternatively, the low sampling rate signal generator, and the high sampling rate signal generator, may be combined in a single signal generator element, which operates according to two different modes. In such an embodiment, both sampling rates are provided by reducing the sampling rate of a signal generator to the sampling rate required by each mode. Such a combined signal generator element is coupled to the mixer. The mixer is further coupled to a controller, which operates the mixer, to shape Baseband data, when transmitting to old generation devices. Other aspects of the transmitter remain essentially the same as described for the transmitter in FIG. 6A. According to another embodiment of the disclosed technique (riot shown), which is directed for operating in digital mode, the signal shaper 286 and up-sampler 288 are coupled after modulator 282, and operate on carrier modulated signals.

Figure 6B:
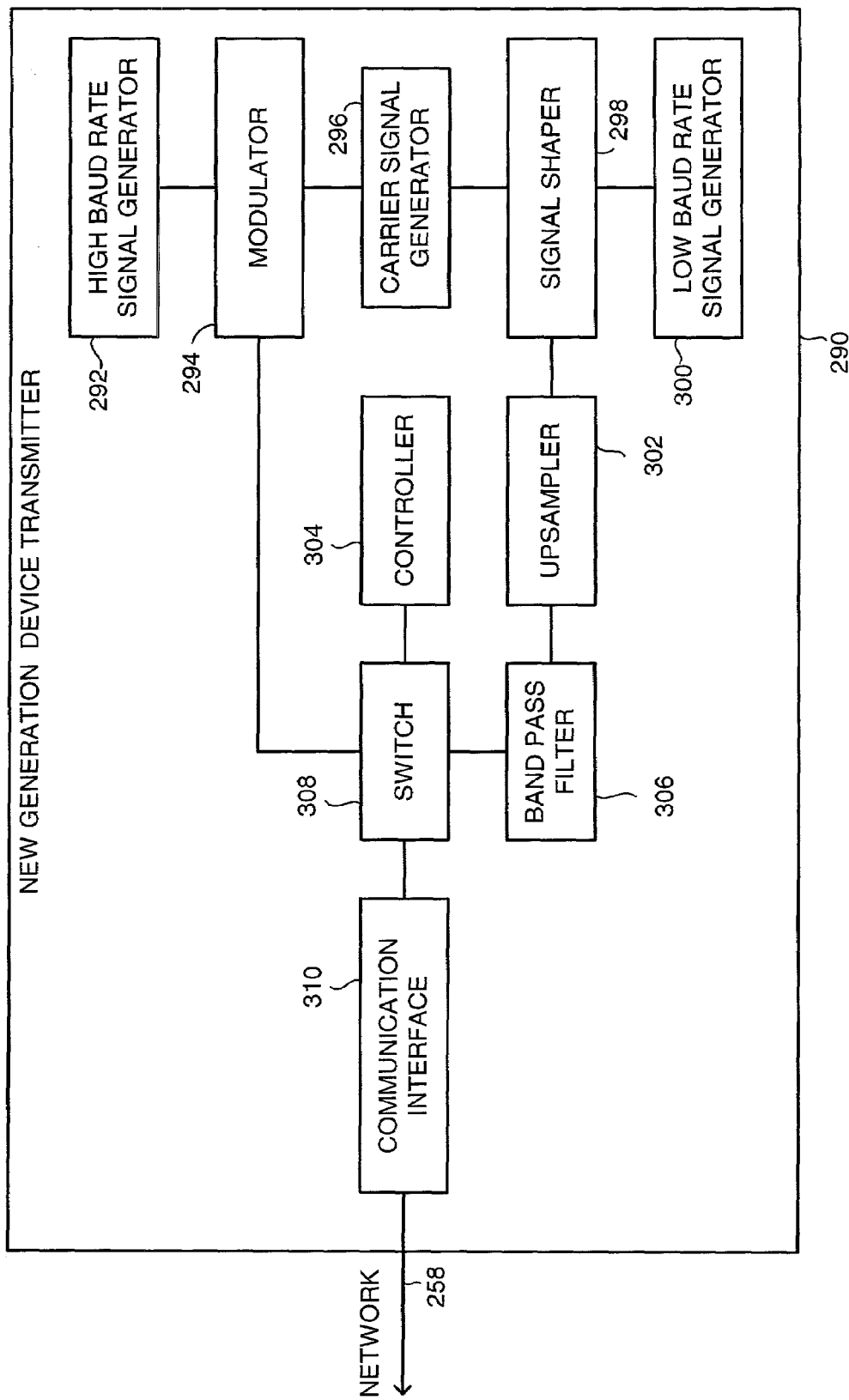
FIG. 6B is a schematic illustration of a new generation device transmitter, constructed and operative in accordance with an embodiment of the disclosed technique.

Reference is now made to FIG. 6B, which is a schematic illustration of a transmitter, generally referenced 2970, of new generation device 252 of FIG. 5, constructed and operative in accordance with another embodiment of the disclosed technique. Transmitter 290 includes a high baud rate signal generator 292, a modulator 294, a carrier signal generator 296, a signal shaper 298, a low baud rate signal generator 300, an up-sampler 302, a controller 304, a band pass filter 306, a switch 308, and a communication interface 310.

High baud rate signal generator 292 is coupled with modulator 294. Modulator 294 is further coupled with carrier signal generator 296 and with switch 308. Signal shaper 298 is coupled with carrier signal generator 296, low baud rate signal generator 300, and with up-sampler 302. Band pass filter 306 is coupled with up-sampler 302, and with switch 308. Switch 308 is further coupled with controller 304, and with communication interface 310. Communication interface 310 is further coupled with network 258 (not shown) of FIG. 5. Transmitter 290 is operative to produce transmission signals compatible with both old generation format devices and new generation format devices, by employing the above illustrated technique.

When transmitting to new generation format devices, transmitter 290 uses high baud rate signal generator 292, to generate Baseband data. High baud rate signal generator 292 provides the Baseband data to modulator 294. Carrier signal generator 296 produces a carrier signal and provides it to modulator 294. Modulator 294 modulates the high rate Baseband signal with the carrier signal, thereby producing transmission signal. Modulator 294 provides the transmission signal to switch 308, which in turn, provides the transmission signal to communication interface 310, which transmits the transmission signal to network 258.

When transmitting to old generation format devices, transmitter 290 uses low baud rate signal generator 300, to generate Baseband data. Low baud rate signal generator 300 provides the Baseband data to signal shaper 298, which shapes the Baseband data so as to produce an old generation basic signal copy, when duplicated in the frequency domain, and used to modulate the new generation carrier signal, according to the technique illustrated herein above. Signal shaper 298 further mixed the shaped Baseband signal with a carrier signal, received from carrier signal generator 296, to produce a mixed Baseband signal. Signal shaper 298 provides the mixed Baseband data to up-sampler 302. Up-sampler 302 performs up-sampling of the data, to produce a Baseband signal, which includes multiple copies, of the shaped Baseband signal, in accordance with the technique illustrated above. Up-sampler 302 provides the up-sampled Baseband signal to band pass filter 306, which restricts the up-sampled signal to the new generation signal bandwidth. The combination of the mixing performed by signal shaper 298 an the filtering performed by band pass filter 306, effectively modulates the shaped Baseband signal on a new generation carrier signal thus producing a transmission signal. Band pass filter 306, provides the transmission signal to communication interface 310, via switch 308. Other elements of the transmission path are unchanged with respect to transmission to new generation format devices.

Controller 304 performs selection between different generation format data, by operating switch 310, to couple with desired transmission signal source. Controller 310 is controlled by other elements (not shown) of communication device 252 (FIG. 5).

Figure 7A:
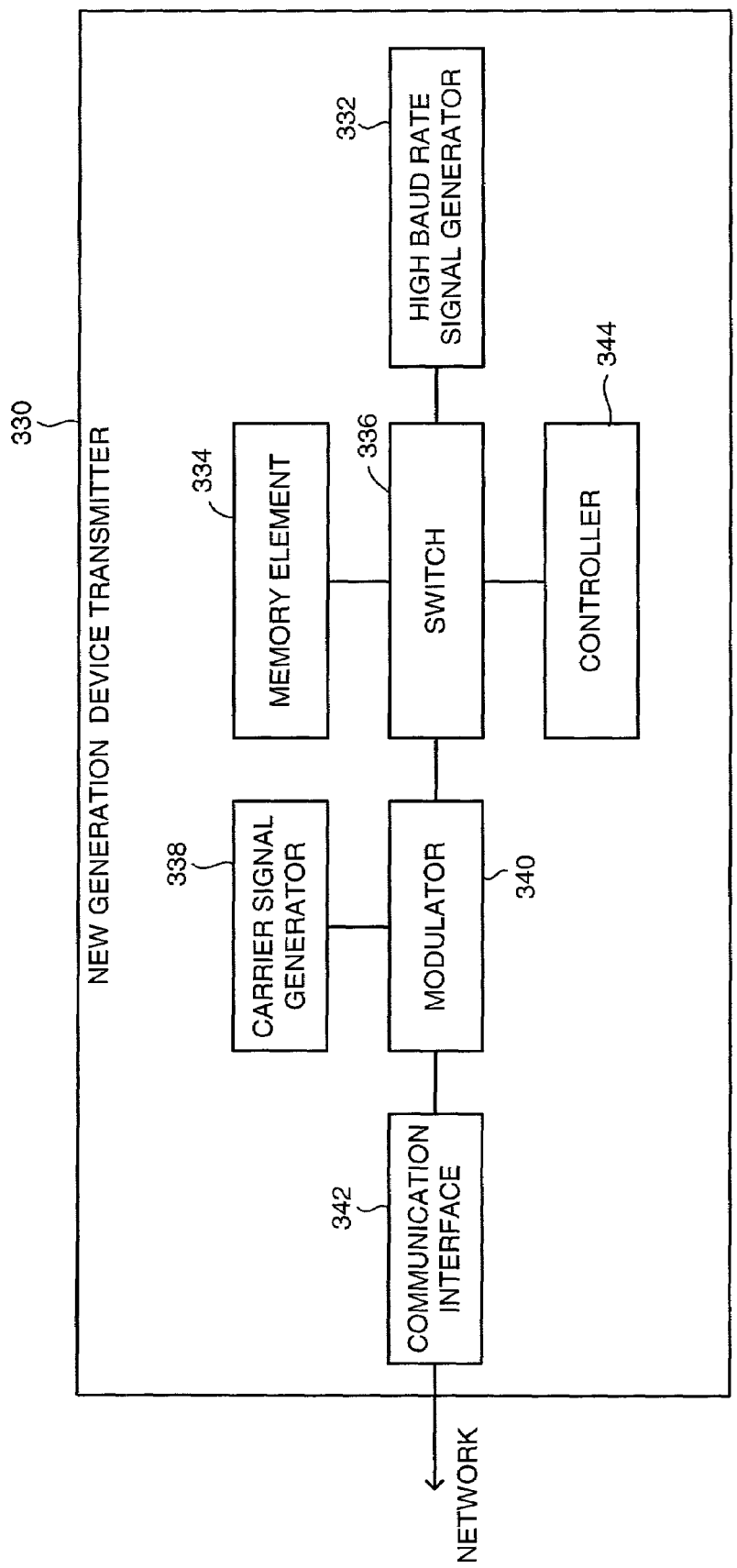
FIG. 7A is a schematic illustration of a new generation device transmitter, constructed and operative in accordance with an embodiment of the disclosed technique.

Reference is now made to FIG. 7A, which is a schematic illustration of a transmitter, generally referenced 330, of new generation device 252 of FIG. 5 constructed and operative in accordance with another embodiment of the disclosed technique.

Transmitter 330 includes a high baud rate signal generator 332, a memory element 334, a switch 336, a carrier signal generator 338, a modulator 340, a controller 344, and a communication interface 342. Switch 336 is coupled with high baud rate signal generator 332, with memory element 334, with controller 344 and with modulator 340. Modulator 340 is further coupled with carrier signal generator 338 and with communication interface 342. Communication interface 342 is coupled with network 258 of FIG. 5 (not shown). Transmitter 330 is operative to produce transmission signals compatible with new generation format devices, which will be ignored by old generation format devices, thus allowing old, and new, generation devices to coexist on the same physical network, without interference.

Transmitter 330 uses high baud rate signal generator 332, to generate Baseband data. High baud rate signal generator 332 provides the Baseband data to switch 336. Memory element 334 provides pre-stored old generation format header portion, to switch 336. The old generation format header portion instructs old generation devices to ignore the rest of the transmission. The stored old generation format header portion, is spectrally shaped, as to resemble old generation format header portion, when demodulated with respect to old generation carrier signal, in accordance with the principles illustrated herein above. Controller 344 operates switch 336 to prepend old generation format header portion, to Baseband data, creating a pre-modulated transmission signal. Switch 336 provides pre-modulated transmission signal to modulator 340. Carrier signal generator 338 produces a carrier signal and provides it to modulator 340. Modulator 340 modulates the pre-modulated transmission signal with the carrier signal, thereby producing transmission signal. Modulator 340 provides the transmission signal to communication interface 342, which in turn, transmits the transmission signal to network 258.

In accordance with this embodiment of the disclosed technique, old generation devices will therefore ignore all transmissions from the new generation device, allowing coexistence of old, and new generation devices, on the same physical network.

Figure 7B:
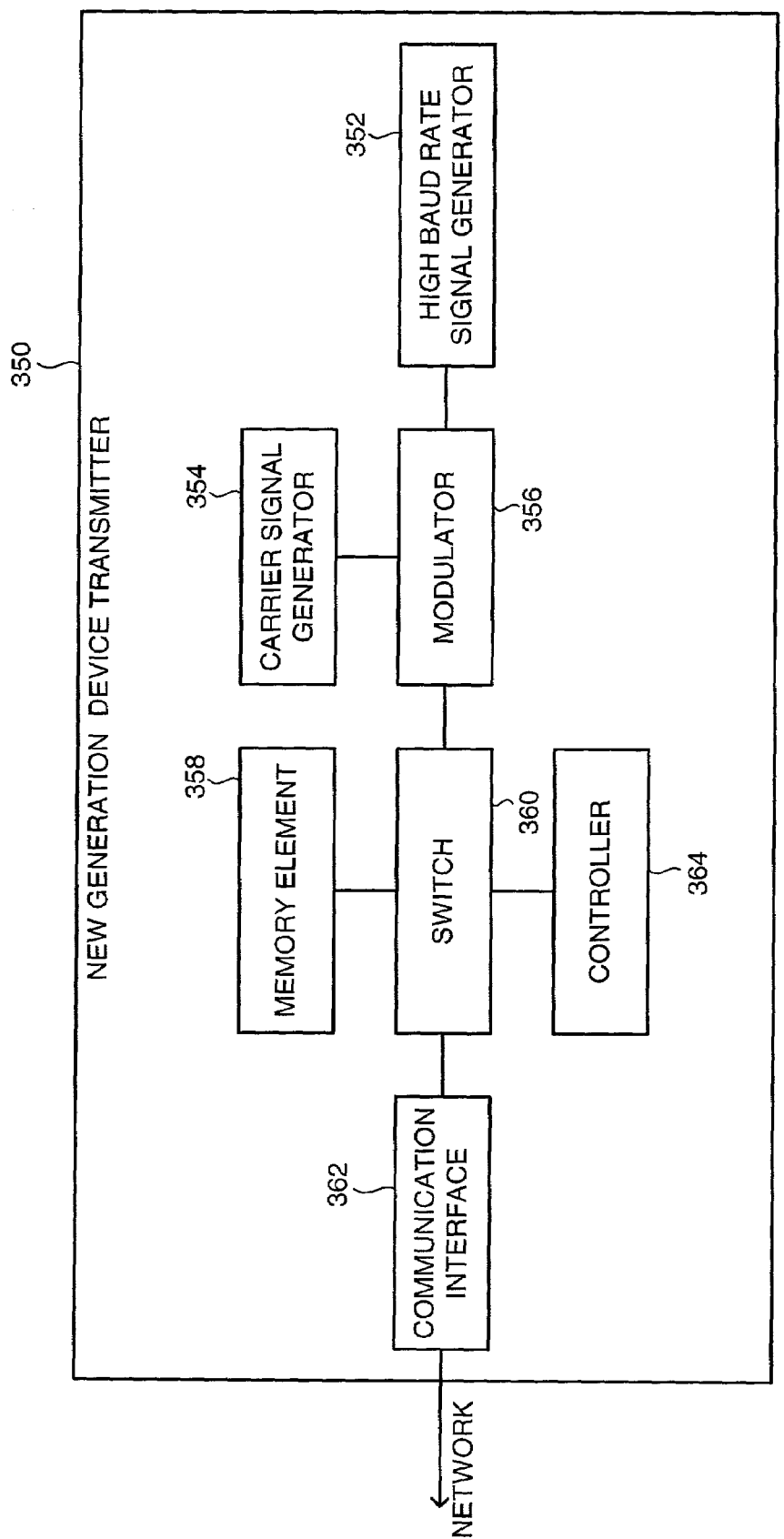
FIG. 7B is a schematic illustration of a new generation device transmitter, constructed and operative in accordance with an embodiment of the disclosed technique.

Reference is now made to FIG. 7B, which is a schematic illustration of a transmitter, generally referenced 350, of new generation device 252 of FIG. 5 constructed and operative in accordance with another embodiment of the disclosed technique. Transmitter 350 includes a high baud rate signal generator 352, a memory element 358, a switch 360, a carrier signal generator 354, a modulator 356, a controller 364 and a communication interface 362.

Modulator 356 is coupled with high baud rate signal generator 352, carrier signal generator 354, and with switch 360. Switch 360 is further coupled with memory element 358, with controller 364 and with communication interface 362. Communication interface 362 is coupled with network 258 of FIG. 5 (not shown). Transmitter 350 is operative to produce transmission signals compatible with new generation format devices, which will be ignored by old generation format devices, thus allowing old, and new, generation devices to coexist on the same physical network, without interference.

Transmitter 350 uses high baud rate signal generator 352, to generate Baseband data. High baud rate signal generator 352 provides the Baseband data to modulator 356. Modulator 356 modulated the Baseband data with a carrier signal received from carrier signal generator 354. Memory element 358 provides pre-stored old generation format header portion, already modulated with a new generation carrier signal, having the same frequency as the signal provided by carrier signal generator 354, to switch 360. The old generation format header portion instructs old generation devices to ignore the rest of the transmission. The stored old generation format header portion, is spectrally shaped, as to resemble old generation format header portion, when demodulated with respect to old generation carrier signal, in accordance with the principles illustrated herein above. Controller 364 operates switch 360 to prepend old generation format header portion, to the modulated Baseband data, received from modulator 356, creating a transmission signal. Switch 360 provides the transmission signal to communication interface 362, which in turn, transmits the transmission signal to network 258.

In accordance with this embodiment of the disclosed technique, old generation devices will therefore ignore all transmissions from the new generation device, allowing coexistence of old, and new generation devices, on the same physical network.

Figure 8:
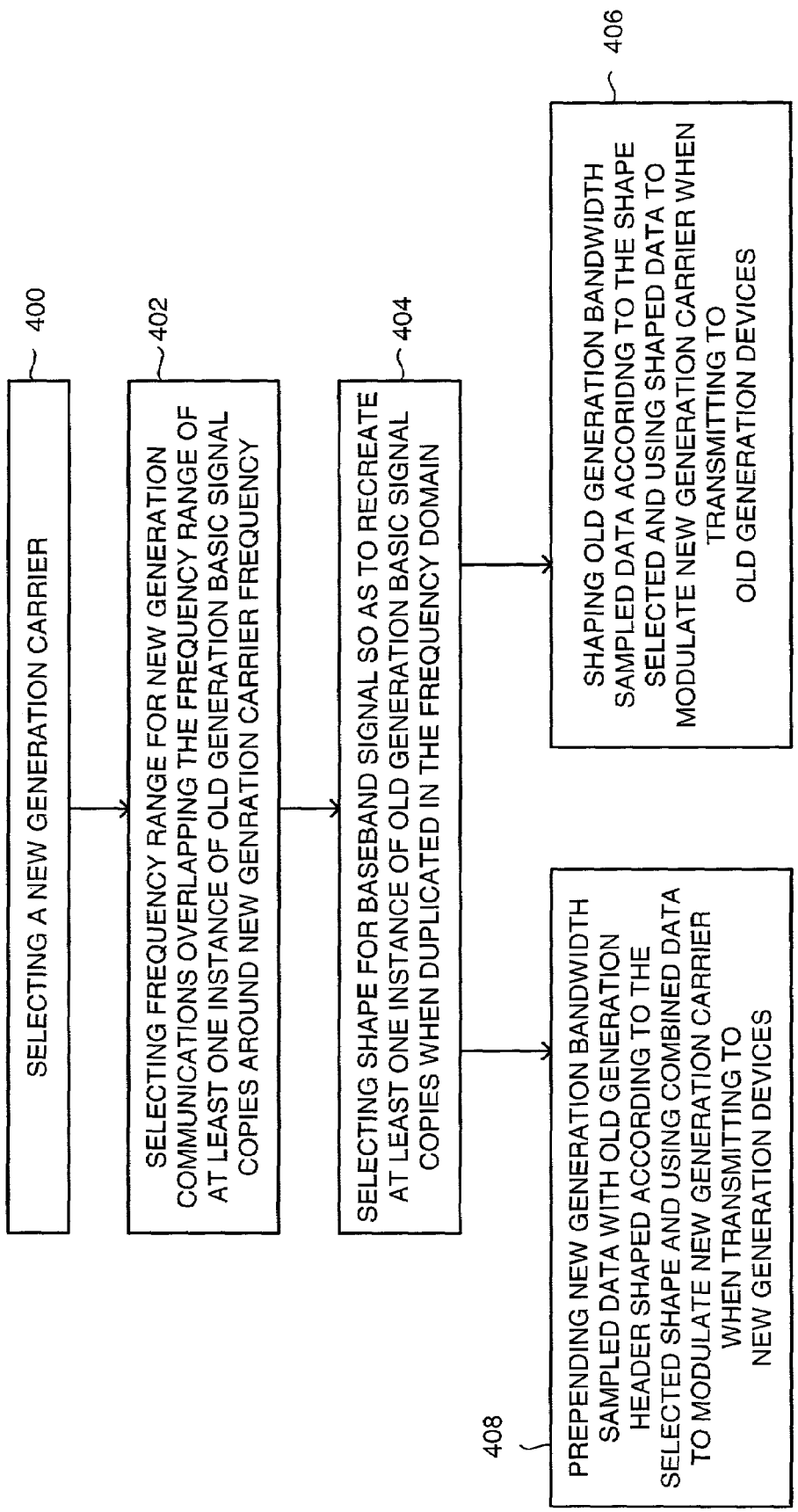
FIG. 8 is a schematic illustration of a method for backward compatible communication, operative in accordance with another embodiment of the disclosed technique.

Reference is now made to FIG. 8, which is a schematic illustration of a method for backward compatible communication, operative in accordance with another embodiment of the disclosed technique.

In procedure 400, a carrier frequency for a new generation device is selected. It is noted that no constrains exist regarding the new generation carrier frequency.

In procedure 402, the frequency range for the new generation device is selected. The frequency range is selected so as to overlap at least one instance, of the old generation basic signals.

In the example set forth in FIG. 4, the selected frequency range, between 4.75 MHz and 15.25 MHz, overlaps two instances of the old generation basic signal, $164_0$ and $164_{+1}$. It is noted that the selected frequency range, could also have been selected to overlap one, or three of the basic signal instances, for example, by selecting a frequency range of 8 MHz-12 MHz, which overlaps only one instance of the basic signals (referenced $164_{+1}$).

In procedure 404, a signal shape for the Baseband signal is selected, for use when transmitting to old generation devices. The signal shape is selected so as to recreate an old generation basic signal copy, when duplicated in the frequency domain, and further modulates the new generation carrier signal. In the example set forth in FIG. 4, the selected signal shape, modifies the original signal to a shaped signal, so that a combination of portions of adjacent copies thereof, are perceived to be centered on a frequency located at an integer multiple of old generation Baseband bandwidths, away from an old generation carrier frequency.

Procedure 406 is directed for transmitting to old generation devices. In procedure 406, data sampled with the old generation sampling rate bandwidth is shaped in accordance with the shape selected in procedure 404. The shaped sampled data modulates the new generation carrier signal, thereby producing a transmission signal which includes at least one instance of a basic signal according to the old generation format, in accordance with the principles illustrated above.

In the example set forth in FIG. 4, 2 MHz shaped sampled data, is used to modulate the 10 MHz carrier signal. The resulting transmission signal includes instances of basic signal $174_{-2}$, $174_{-1}$, $174_0$, $174_{+1}$, and $174_{+2}$, when duplicated in the frequency domain, in accordance with the principles illustrated above. Basic signal copies $174_{-1}$, $174_0$ and a portion of basic signal copy $174_{-2}$, produce signals which are compatible with old generation basic signals $164_0$ and $164_{+1}$, thus allowing old generation devices to demodulate the transmitted signal and extract the data.

Procedure 408 is directed for transmitting to new generation devices. In procedure 408, data sampled with the new generation sampling rate bandwidth is prepended with a header portion generated in the old format data and shaped in accordance with the shape selected in procedure 404. The header portion instructs old generation format devices, to ignore the rest of the transmission. The combined data and header portion, modulate the new generation carrier signal, thereby producing a transmission signal which includes a single instance of a basic signal according to the new generation format, and a header portion which ensures that old generation format devices will ignore the transmission.

It will be appreciated by persons skilled in the art that the present invention is not limited to what has been particularly shown and described hereinabove. Rather the scope of the present invention is defined only by the claims, which follow.

The invention claimed is:

1. Communications method comprising the procedure of:
   mixing a first generation bandwidth Baseband signal with a second generation carrier signal, to produce a mixed first generation bandwidth Baseband signal, having a first generation Baseband bandwidth,
   wherein, before mixing, said first generation bandwidth Baseband signal is spectrally shifted, by a factor based on the difference between a frequency of a first generation carrier signal and a frequency of the second generation carrier signal, divided by said first generation Baseband bandwidth, when transmitting to first generation devices by second generation devices to provide backwards compatibility of second generation devices to first generation devices,
   transmitting said mixed first generation bandwidth Baseband signal to first generation devices by a second generation device.

2. The communications method according to claim 1, further comprising the procedure of:
   duplicating said mixed first generation bandwidth Baseband signal, in the frequency domain, thereby producing at least one spectral copy of said mixed first generation bandwidth Baseband signal.

3. The communications method according to claim 2, wherein said procedure of duplicating is performed by up-sampling said mixed first generation bandwidth Baseband signal.

4. The communications method according to claim 1, wherein said first generation bandwidth Baseband signal is in analog format.

5. The communications method according to claim 1, wherein said first generation bandwidth Baseband signal is in digital format.

6. The communications method according to claim 1, wherein a frequency range of said second generation devices overlaps a frequency range of said first generation devices.

7. The communications method according to claim 1, wherein said mixing is performed in an analog format.

8. The communications method according to claim 1, wherein said mixing is performed in a digital format.

9. The communications method according to claim 1, wherein said mixed first generation bandwidth Baseband signal is in digital format.

10. The communications method according to claim 1, wherein said mixed first generation bandwidth Baseband signal is in analog format.

11. The communications method according to claim 1, wherein said second generation carrier signal is in analog format.

12. The communications method according to claim 1, wherein said second generation carrier signal is in digital format.

13. The communications method according to claim 1, wherein said second generation bandwidth Baseband signal is in analog format.

14. The communications method according to claim 1, wherein said second generation bandwidth Baseband signal is in digital format.

15. The communications method according to claim 1, wherein said second generation carrier signal is in digital format.

16. The communications method according to claim 1, wherein said second generation carrier signal is in analog format.

17. A Multiple generation communications device comprising:
   a first signal generator, generating a first generation bandwidth Baseband signal;
   a second signal generator, generating a second generation bandwidth Baseband signal;
   a signal shaper, coupled with said first signal generator;
   a controller;
   a switch, coupled with said controller, said second signal generator and said signal shaper;
   a carrier signal generator, providing a second generation carrier signal;
   a modulator, coupled with said switch and said carrier signal generator,
   wherein said signal shaper shapes said first generation bandwidth Baseband signal, to produce a first generation basic signal copy centered around a first generation carrier signal, when said first generation bandwidth Baseband signal is duplicated in the frequency domain;
   wherein said switch couples said signal shaper with said modulator, when said controller selects a coupled output from said signal shaper to modulate said second generation carrier signal;
   wherein said switch couples said second signal generator with said modulator, when said controller selects said second generation bandwidth Baseband signal to modulate said second generation carrier signal; and
   wherein said modulator modulates the selected one of said coupled output from said signal shaper and said second generation bandwidth Baseband signal, with said second generation carrier signal, thereby producing a transmission signal.

18. The multiple generation communications device, according to claim 17, further comprising a communication interface, coupled with said modulator, said communication interface providing said transmission signal to a network.

19. The multiple generation communications device, according to claim 17, further comprising an up-sampler, coupled with said signal shaper, said up-sampler up-sampling said shaped first generation bandwidth Baseband signal, thereby producing multiple copies of said shaped first generation bandwidth Baseband signal in the frequency domain.

20. The multiple generation communications device according to claim 17, wherein said controller selects said coupled output from said signal shaper to modulate said second generation carrier signal, when transmitting to first generation communication devices.

21. The multiple generation communications device according to claim 17, wherein said controller selects said second generation bandwidth Baseband signal to modulate said second generation carrier signal, when transmitting to second generation communication devices.

22. The multiple generation communications device according to claim 17, wherein said first generation bandwidth Baseband signal is in digital format.

23. The multiple generation communications device according to claim 17, wherein said first generation bandwidth Baseband signal is in analog format.

24. The multiple generation communications device according to claim 17, wherein said second generation bandwidth Baseband signal is in digital format.

25. The multiple generation communications device according to claim 17, wherein said second generation bandwidth Baseband signal is in analog format.

26. The multiple generation communications device according to claim 17, wherein said second generation carrier signal is in digital format.

27. The multiple generation communications device according to claim 17, wherein said second generation carrier signal is in analog format.

28. The multiple generation communications device according to claim 18, wherein said communication interface is further coupled with a wired network.

29. The multiple generation communications device according to claim 18, wherein said communication interface is further coupled with a wireless network.

30. Multiple generation communications network architecture comprising:
    a network;
    at least one first generation communications device, coupled with said network; and
    at least one second generation communications device, coupled with said network,
    wherein at least one of said at least one second generation communications device comprises:
    a first signal generator, generating a first generation bandwidth Baseband signal;
    a second signal generator, generating a second generation bandwidth Baseband signal;
    a signal shaper, coupled with said second signal generator;
    a controller;
    a switch, coupled with said controller, said first signal generator and said signal shaper;
    a carrier signal generator, providing a second generation carrier signal;
    a modulator, coupled with said switch and said carrier signal generator,
    wherein said signal shaper shapes said first generation bandwidth Baseband signal, to produce a first generation basic signal copy centered around a first generation carrier signal, when said first generation bandwidth Baseband signal is duplicated in the frequency domain;
    wherein said switch couples said signal shaper with said modulator, when said controller selects a coupled output from said signal shaper to modulate said second generation carrier signal;
    wherein said switch couples said second signal generator with said modulator, when said controller selects said second generation bandwidth Baseband signal to modulate said second generation carrier signal; and
    wherein said modulator modulates the selected one of said coupled output from said signal shaper and said second generation bandwidth Baseband signal, with said second generation carrier signal, thereby producing a transmission signal.

31. The multiple generation communications network according to claim 30, wherein said network is a wired network.

32. The multiple generation communications network according to claim 30, wherein said network is a wireless network.

33. Method for operating a multiple generation communications network, comprising the procedures of:
    shaping first generation bandwidth sampled data, according to a selected shape, thereby producing shaped data; and
    modulating a second generation carrier with said shaped data, when transmitting to first generation devices,
    wherein said selected shape is selected so as to recreate at least one instance of a first generation basic signal copy, when duplicated in the frequency domain around said second generation carrier; and
    wherein shaping said first generation bandwidth sampled data spectrally shifts said first generation bandwidth sampled data by a factor based on the difference between a first generation carrier signal frequency and a second generation carrier signal frequency, divided by a bandwidth of said first generation bandwidth sampled data to provide backwards compatibility of second generation devices to first generation devices,
    transmitting said modulated second generation carrier to first generation devices by a second generation device.

34. The method according to claim 33, further comprising the procedures of:
    prepending second generation bandwidth sampled data with at least a portion of a first generation format header, thereby producing combined data; and
    modulating the second generation carrier with said combined data, when transmitting to second generation devices,
    wherein said at least a portion of first generation format header is shaped according to said selected shape.

35. The method according to claim 33, further comprising a preliminary procedure of selecting said shape.

36. The method according to claim 33, further comprising a preliminary procedure of selecting a frequency range for second generation communications, said frequency range overlapping a first generation communications range.

37. Multiple generation communications device comprising:
    means for generating a first generation bandwidth Baseband signal;
    means for generating a second generation bandwidth Baseband signal;
    means for shaping a signal, coupled with said means for generating a first generation bandwidth Baseband signal;
    means for controlling;
    means for switching, coupled with said means for controlling, said means for generating a second generation bandwidth Baseband signal and said means for shaping a signal;
    means for generating a carrier signal, providing a second generation carrier signal;
    means for modulating, coupled with said means for switching and said means for generating a carrier signal,
    wherein said means for shaping a signal shapes said first generation bandwidth Baseband signal, to produce a first generation basic signal copy centered around a first generation carrier signal, when said first generation bandwidth Baseband signal is duplicated in the frequency domain;
    wherein said means for switching couples said means for shaping a signal with said means for modulating, when said means for controlling selects a coupled output from said means for shaping a signal to modulate said second generation carrier signal;
    wherein said means for switching couples said means for generating a second generation bandwidth Baseband signal with said means for modulating, when said means for controlling selects said second generation bandwidth Baseband signal to modulate said second generation carrier signal; and
    wherein said means for modulating modulates the selected one of said coupled output from said means for shaping a signal and said second generation bandwidth Baseband signal, with said second generation carrier signal, thereby producing a transmission signal.

38. The multiple generation communications device, according to claim 37, further comprising a means for communicating with a network, coupled with said means for modulating, said means for communicating with a network providing said transmission signal to a network.

39. The multiple generation communications device, according to claim 37, further comprising a means for up-sampling, coupled with said means for shaping a signal, said means for up-sampling said shaped first generation bandwidth Baseband signal, thereby producing multiple copies of said shaped first generation bandwidth Baseband signal in the frequency domain.

40. The multiple generation communications device according to claim 37, wherein said means for controlling selects said coupled output from said means for shaping a signal to modulate said second generation carrier signal, when transmitting to first generation communication devices.

41. The multiple generation communications device according to claim 37, wherein said means for controlling selects said second generation bandwidth Baseband signal to modulate said second generation carrier signal, when transmitting to second generation communication devices.

42. The multiple generation communications device according to claim 37, wherein said first generation bandwidth Baseband signal is in digital format.

* * * * *